United States Patent [19]

Harms et al.

[11] Patent Number: 4,551,362
[45] Date of Patent: Nov. 5, 1985

[54] METHOD OF TREATING UNVULCANIZED ELASTOMERIC OBJECTS

[75] Inventors: Engelbert G. Harms; Axel W. Schmeitz, both of Aachen; Hubertus P. Thomaschewski, Alsdorf, all of Fed. Rep. of Germany

[73] Assignee: Uniroyal Englebert Reifen GmbH, Aachen, Fed. Rep. of Germany

[21] Appl. No.: 643,659

[22] Filed: Aug. 23, 1984

[30] Foreign Application Priority Data

Aug. 24, 1983 [DE] Fed. Rep. of Germany ....... 3330505
Aug. 24, 1983 [DE] Fed. Rep. of Germany ... 8324313[U]

[51] Int. Cl.$^4$ ............................................... B05D 1/16
[52] U.S. Cl. .................................... 427/180; 427/289; 427/290
[58] Field of Search ............... 427/180, 202, 204, 205, 427/289, 290

[56] References Cited

U.S. PATENT DOCUMENTS 2,992,957  7/1961  Maxey ............................. 427/180 X
4,393,099  7/1983  Deregibus ....................... 427/205 X

FOREIGN PATENT DOCUMENTS 1265981  3/1972  United Kingdom ............... 427/180

Primary Examiner—Shrive P. Beck
Attorney, Agent, or Firm—Becker & Becker, Inc.

[57] ABSTRACT

A method of treating the surfaces of elastomeric unvulcanized molded objects or semi-finished products for use in further manufacturing; the surfaces are neutralized with a separating material in the form of unvulcanized powdery rubber. This produces a good neutralization and an improved product quality, especially with objects which are produced by vulcanization.

5 Claims, 3 Drawing Figures

METHOD OF TREATING UNVULCANIZED ELASTOMERIC OBJECTS

BACKGROUND OF THE INVENTION

1. Field of the Invention

The present invention relates to a method of treating at least the surface of unvulcanized and therefore tacky elastomeric semi-finished products for use in further manufacturing, or molded objects, with a powdery or dust-like separating material which neutralizes the tackiness.

The surfaces of the unvulcanized elastomeric molded objects and semi-finished products are tacky. On the one hand for reasons of good bonding action, this is desirable for subsequent treatment. Thus, for example, if semi-finished products are to be bonded with other such products, or are to be built-up one upon the other, before being polymerized or vulcanized, such tackiness is desirable.

On the other hand, this tackiness is undesirable and disruptive if such semi-finished products are to be temporarily stored, packaged, or transported prior to being bonded and vulcanized with other parts.

Furthermore, certain problems exist in the region of the production molds with regard to venting, molding, and removal from the molds if these elastomeric molded obJects and semifinished products are to be vulcanized.

2. Description of the Prior Art

In order to neutralize the tackiness, various separating materials have been used for many years in order to treat and thus neutralize the tacky surfaces.

It is known to coat or dust the tacky surface with dissolved carbon black, with corn meal, or with zinc stearate.

It also is known to dust the tacky surface with rubber powder, especially for the perforated side panels in the retreading of vehicle tires. Tacky surfaces are furthermore powdered with hard rubber dust or coarse powder. Such powdery or dust-like separating material is obtained by roughing and grinding rubber parts during tire retreading. See Austrian Pat. No. 293 902, and German Pat. Nos. 19 43 876 and 818 419.

The common aspect of the heretofore known powdery or dustlike separating materials for neutralizing tackiness is that these materials are fine particles of a vulcanized and cured rubber product. The chemical and physical properties differ considerably, at least in part, from those of a nonvulcanized elastomeric part, for example, the purity is non-uniform, the granular sizes and the consistency differ from that of unvulcanized parts. Furthermore, powder from vulcanized rubber is, to a certain extent, foreign matter relative to the nonvulcanized elastomeric molded object or the elastomeric semi-finished product to which powdery rubber is to be applied.

Any form of foreign matter relative to the elastomers should be avoided, because the homogeneity of a product made of any desired elastomer is adversely affected thereby when it is to be polymerized or vulcanized.

An object of the present invention is to improve the method of treating a tacky elastomeric surface in such a way that not only is the tackiness neutralized, but the quality of the bond between the elastomeric molded object or semifinished product and an elastomeric molded part which is not polymerized, or a molded rubber part, is improved; the bond should be more homogeneous.

In addition to the neutralization of the tackiness, and the improvement of the quality of the bond, a further object of the present invention is that a smaller quantity of separating material will suffice in comparison to the heretofore known materials and measures.

BRIEF DESCRIPTION OF THE DRAWING

These objects, and other objects and advantages of the present invention, will appear more clearly from the following specification in conjunction with the accompanying drawing, in which.

SUMMARY OF THE INVENTION

Figure 1:
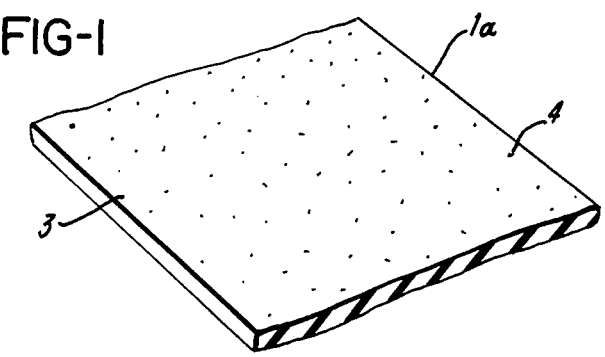
FIG. 1 shows a perspective view of a portion of a rubber sheet having a smooth surface.
Figure 2:
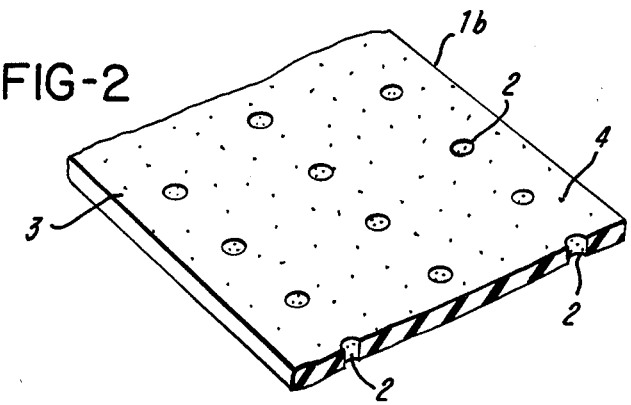
FIG. 2 is a perspective view of a portion of a rubber sheet having perforations in the surface.
Figure 3:
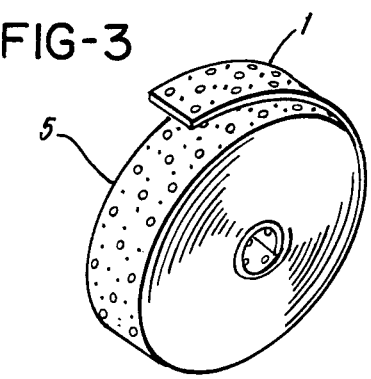
FIG. 3 is a perspective view showing a rolled up band of rubber.

The method of the present invention is characterized primarily in that the separating material is in the form of unvulcanized powdery rubber, and is applied to the surface.

The powdery rubber can contain different types and amounts of elastomer, carbon black, and plasticizer. The powdery rubber can be in the form of powder batch, i.e. powdery rubber master batch, or as a finished powdery rubber mixture. In this way there is provided a universal separating material, over which, should this be necessary, influence can be exerted as to the composition and variation of the individual components, as well as over the physical and chemical properties.

If the semi-finished product or the molded object is perforated, the unvulcanized powdery rubber can be applied to the surface and to the walls of the perforations. The semi-finished product first can be perforated and then neutralized with powdery rubber, or conversely, the surface first can be neutralized, and then can be perforated.

In the simple situation, the separating material comprises powdery rubber, into which carbon black has been incorporated or tumbled, preferably during the polymerization phase. The powdery rubber or powdery rubber mixture can be applied to the surface of the semi-finished product or the molded object by being dusted, powdered, or coated thereon.

With the aid of a coating or dosing powder device, the separating material is applied to the surface, or to the surface and the walls of the perforations, which are to be neutralized; if necessary, excess separating material can be removed from the surface by means of a brush roller.

The powdery rubber has distinct advantages compared with the rubber powder or the coarse powder. The powdery rubber is a nonvulcanized separating material. And is uniform in granular size and shape, and also is characterized by a high degree of purity. The powdery rubber can be easily stored and flows freely; as a result, the powdery rubber can be applied in very thin, low-density layers which scarcely can be seen or felt. The small and uniform granular sizes, as well as the thinly applied layer, result in no clogging of the holes of unvulcanized semi-finished products which are perforated or provided with holes. Thus, a satisfactory venting is assured at all times.

The inventive separating material guarantees that the molded body slides on the manufacturing mold face. Errors in the pattern and shifting of the material are thereby avoided.

The powdery rubber separating material enters into an outstandingly strong bond with the carrier material. A disadvantageous alteration of the surface property, and disadvantageous consequences, are avoided. A strong, homogeneous bond exists with the carrier material. The polymerized or vulcanized product is resistant to ozone cracks, is resistant to tears, and does not show material fatigue. The present invention uses considerably less separating material than was heretofore used for rubber powder or coarse powder.

The tacky surface treated with the powdery rubber can be smooth without having any holes, the tacky surface also can be structured, and also can be perforated. The dusting with powdery rubber can take place prior to or subsequent to the perforation.

DESCRIPTION OF PREFERRED EMBODIMENTS

Referring now to the drawing in detail, shown are semi-finished products for use in further manufacturing, with examples of such products including profiled members, sheets 1, or strips of unvulcanized elastomeric mixtures, which are produced, for example, by extrusion or calendering. Such semi-finished products have very tacky surfaces 3. On the one hand, these tacky surfaces are desirable in order to achieve a strong bond with other product parts. On the other hand, however, that surface 3 of the sheet 1 which faces away from the finished product is undesirable because it sticks to unvulcanized further product parts or mold walls. Furthermore, these exposed tacky surfaces cause venting and mold removal problems in the product mold. These surfaces can lead to flaws in the products and to rejects.

Therefore, the tacky surfaces 3 of a semi-finished product 1a, or also the walls of the holes in the case of a semi-finished product 1b or roll 5 which has perforations 2, can be provided with separating material in the form of powdery rubber 4.

The powdery rubber or the powdery rubber mixture comprises one elastomeric component or several elastomeric components respectively, and contains carbon black in separate, incorporated, or tumbled form. The powdery rubber can also can be utilized as separating material in the form of the powder batch, i.e. a master batch, or in the form of a finished mixture, in which case plasticizer and further additives are then present in the separating material.

The composition of the individual components, including elastomers, carbon black, and possibly plasticizers, etc., can depend upon the physical and chemical properties of the elastomeric semi-finished product, the surface of which is to be neutralized. In this way, appropriate influence can be exerted upon the bond via the separating material.

With the aid of a coating device or powder-applying apparatus, the separating material is applied to the surface which is to be neutralized. An apparatus such as a brush roller additionally can distribute the separating material and can remove excess separating material. In comparison to the heretofore known rubber powder, the quantity of separating material required with the powdery rubber of the present invention is approximately 1/10 to 1/6 per unit area of that heretofore required.

With unvulcanized elastomeric semi-finished products, the utilization of the powdery rubber as separating material takes place prior to the temporary storage of the products and the bonding thereof with further unvulcanized elastomeric semi-finished products, such as sheets, strips, and bands; with unvulcanized elastomeric molded objects, such as unfinished tires or hollow bodies, containers, or other molded parts, the same is true, with the bonding being effected in particular by vulcanization. The powdery rubber is either applied only to the outside or only to the inside of the surface in question. With unvulcanized elastomeric semi-finished products, the utilization also takes place prior to the temporary storage and connection with a rubber molded object, for example a tire which can be retreaded with new side strips and/or treads or other parts, with the bonding again being effected in particular by vulcanization.

The utilization of the unvulcanized powdery rubber as separating material has the following advantages: it is very uniform in granular size and shape, it is small, and is characterized by a high degree of purity. The powder rubber can be very satisfactorily stored, and flows very freely. And is therefore applied in a very thin layer which scarcely can be seen or felt. These properties are assured even after the powdery rubber has been stored for a long period of time.

The small and uniform granular size, and the thin amount which is applied, cause no clogging or hindrance of venting, neither with nonperforated nor with perforated semi-finished products.

The powdery rubber enters into an outstandingly strong bond with the carrier material, so that subsequent to vulcanization, a homogeneous bond and a very good surface state exist The material fatigue property is improved, as are the properties relative to the resistance to ozone cracking, and to the formation of jagged tears.

The powdery rubber is an outstanding separating material for keeping product parts from sticking together, and is an outstanding mold separating material between the molded part and the mold.

The powdery rubber furthermore assures a good sliding property on the wall of the mold, and also assures good venting. Errors in the pattern and shifting of the material are thereby avoided. Advantages furthermore result with regard to a reduced rate of accumulation of dirt on and in the mold.

Semi-finished products are customarily extruded or calendered in the form of profiled sheets and strips or bands. The elastomeric or plasticizing components make the surfaces very tacky. This is, of course, desirable in order to achieve a strong bond with other product components, for example for finishing and vulcanization during the retreading of tires or during the manufacture of new tires. On the other hand, the tacky surfaces can be undesirable because these tacky surfaces lead to adhesion, especially to similar product parts, or to the mold; these tacky surfaces also cause venting problems and problems during removal from the mold. Furthermore, these tacky surfaces lead to rejects and/or to failure of the product, which must be avoided. For this reason, the undesirable tacky surfaces are neutralized.

In contrast to the heretofore customary dusting with rubber powder, especially with coarse powder, for the coating with separating material, which is, for example, present in an aqueous solution, There is now proposed pursuant to the inventive concept to apply powdery rubber in very small quantities. The degree of neutralization is very high compared to the heretofore customary separating material. However, the amount of powdery rubber required by the present method is considerably less than the amount of rubber powder which was required in the heretofore known methods. The important thing is that the quality of the product is improved via the powdery rubber, since a homogeneous polymerization of elastomeric carrier material and elastomeric separating material particles results. Furthermore, during the synthesis of the individual components of the powdery rubber, influence can be exerted on the physical and chemical properties of the carrier material, as well as on the further constituents of the elastomeric semi-finished product or molded object.

The composition of the unvulcanized powdery rubber as a separating material which neutralizes tackiness can be directed and adapted to the specific use, for example to the formation of a lateral sheet or a tread strip.

The separating material initially operates as a neutralizing material, and thereafter as a material which promotes bonding, especially during vulcanization.

The present invention is, of course, in no way restricted to the specific disclosure of the specification and drawing, but also encompasses any modifications within the scope of the appended claims

What we claim is:

1. A method of treating at least a surface of an unvulcanized and therefore tacky elastomeric molded object or semi-finished product for use in further manufacturing, said method including the step of neutralizing said thickness with powdery or dust-like separating material thereby avoiding problems with regard to product surface sticking venting, molding and removal from the molds during further manufacturing of semi-finished products;

the improvement therewith comprising the steps of using a separating material which is in the form of an unvulcanized powdery rubber employed as dry and non-adhesive fine particles, and applying said powdery rubber at least to said surface which is to be treated.

2. A method according to claim 1, in which said molded object or semi-finished product is perforated with holes, and which includes the step of applying said unvulcanized powdery rubber to said surface and to the walls of said holes.

3. A method according to claim 2, which includes the steps of first perforating said molded object or semi-finished product, and then neutralizing the latter with said powdery rubber.

4. A method according to claim 1, which includes the steps of first neutralizing said surface with said powdery rubber, and then perforating said molded object or semi-finished product.

5. A method according to claim 1, which includes the steps of providing said separating material from the group consisting of a single powdery rubber containing carbon black, and a powdery rubber mixture containing carbon black, and applying said powdery rubber by dusting, powdering, or coating said surface of said molded object or semi-finished product therewith.

* * * * *